(12) United States Patent
Bohannon

(10) Patent No.: US 12,219,276 B2
(45) Date of Patent: Feb. 4, 2025

(54) SINGLE EXPOSURE HIGH DYNAMIC RANGE (HDR) ANALOG FRONT-END FOR CMOS IMAGE SENSORS

(71) Applicant: Sony Semiconductor Solutions Corporation, Kanagawa (JP)

(72) Inventor: Eric Bohannon, Henrietta, NY (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 317 days.

(21) Appl. No.: 17/695,172

(22) Filed: Mar. 15, 2022

(65) Prior Publication Data
US 2023/0300478 A1   Sep. 21, 2023

(51) Int. Cl.
*H04N 25/57* (2023.01)
*H04N 25/76* (2023.01)

(52) U.S. Cl.
CPC ............ *H04N 25/57* (2023.01); *H04N 25/76* (2023.01)

(58) Field of Classification Search
CPC ...... H04N 25/57; H04N 25/76; H04N 25/581; H04N 25/78; H04N 25/51
See application file for complete search history.

(56) References Cited

U.S. PATENT DOCUMENTS

| | | | | |
|---|---|---|---|---|
| 5,880,460 A * | 3/1999 | Merrill | .................. | H04N 25/627 |
| | | | | 348/E3.018 |
| 2012/0320246 A1* | 12/2012 | Ikuma | ..................... | H04N 25/77 |
| | | | | 348/300 |
| 2022/0408047 A1* | 12/2022 | Okura | ..................... | H04N 25/78 |
| 2023/0232133 A1* | 7/2023 | Miyauchi | ............... | H04N 25/79 |
| | | | | 348/207.99 |
| 2023/0276135 A1* | 8/2023 | Takahashi | ............ | H04N 23/741 |
| | | | | 348/234 |

OTHER PUBLICATIONS

Akahane et al., "A Sensitivity and Linearity Improvement of a 100-dB Dynamic Range CMOS Image Sensor Using a Lateral Overflow Integration Capacitor", IEEE Journal of Solid-State Circuits, vol. 41, No. 4, Apr. 2006 (Year: 2006).*

* cited by examiner

*Primary Examiner* — Sinh Tran
*Assistant Examiner* — Zhenzhen Wu
(74) *Attorney, Agent, or Firm* — Michael Best & Friedrich LLP

(57) ABSTRACT

A single exposure high dynamic range (HDR) analog front-end (AFE) for complementary metal-oxide-semiconductor (CMOS) image sensors. In one embodiment, a single exposure HDR AFE includes input signal circuitry, gain stage circuitry, a continuous-time filter, comparator circuitry, and counter circuitry. The input signal circuitry is configured to generate an input signal. The gain stage circuitry including two gain stages and one gain stage is configured to generate a high gain output signal based on the input signal. The continuous-time filter is configured to generate a filtered high gain output signal by filtering the high gain output signal. The comparator circuitry is configured to generate a high gain comparison signal by comparing the filtered high gain output signal to the ramp voltage. The counter circuitry is configured to generate a high gain digital output signal based on the high gain comparison signal and using the clock signal.

20 Claims, 5 Drawing Sheets

SINGLE EXPOSURE HIGH DYNAMIC RANGE (HDR) ANALOG FRONT-END FOR CMOS IMAGE SENSORS

BACKGROUND OF THE INVENTION

1. Field of the Invention

This application relates generally to electronic devices. More specifically, this application relates to electronic devices with a single exposure high dynamic range (HDR) analog front-end (AFE) for complementary metal-oxide-semiconductor (CMOS) image sensors.

2. Description of Related Art

High Dynamic Range (HDR) is achieved in modern image sensors using many different techniques. These techniques include non-linear techniques (logarithmic compression) and linear techniques (multiple exposure and single exposure). However, many of these techniques come with motion artifacts or are not applicable for a sensor that needs to support a wide range of image resolutions.

BRIEF SUMMARY OF THE INVENTION

In view of the foregoing, a wide range of image resolutions is needed in image sensors that support full imaging and low-power sensing modes for IoT and wearable applications. However, the multiple exposure technique, which changes properties of the pixel or the analog front-end (AFE) across multiple frames potentially introduces motion artifacts as changes are made from frame-to-frame. Also, dual conversion gain techniques are not easily implemented in image sensors that need to span a wide range of resolutions. For example, pixel binning introduced to reduce the image resolution for different sensing modes does not easily allow for configurable conversion gains, at a given image resolution, because the conversion gain is largely set by the wire capacitance that is used to bin the pixels. This wire capacitance is also difficult to configure is support a range of conversion gains.

One application of the present disclosure is an image sensor that supports machine vision. Machine vision is a technology where an image is analyzed by a processing element (e.g., a machine, a computer, or other suitable electronic circuitry) instead of a person. The processing element may be a computer/algorithm/neural network that analyzes the image and then makes further processing decisions based on the content of the image. For example, the processing element may sense motion or detect objects.

When motion is sensed or when objects are detected, then the processing element may perform different tasks. These different tasks may include waking up a host processor for further processing, reconfiguring the image sensor to a different resolution, or going into a different power state (e.g., a low power state). Increasing a dynamic range in a machine vision image improves the ability of electronic circuitry to sense motion or detect objects in the machine vision image.

In one aspect of the present disclosure, there is provided a single exposure high dynamic range (HDR) analog front-end (AFE). The single exposure HDR AFE includes input signal circuitry, gain stage circuitry, a continuous-time filter, comparator circuitry, and counter circuitry. The input signal circuitry configured to generate an input signal. The gain stage circuitry configured to receive the input signal, generate a high gain output signal based on the input signal, and generate a low gain output signal based on the input signal. The continuous-time filter configured to generate a filtered high gain output signal by filtering the high gain output signal. The comparator circuitry configured to receive a ramp voltage, generate a high gain comparison signal by comparing the filtered high gain output signal to the ramp voltage, and generate a low gain comparison signal by comparing the low gain output signal to the ramp voltage. The counter circuitry configured to receive a clock signal, generate a high gain digital output signal based on the high gain comparison signal and using the clock signal, and generate a low gain digital output signal based on the low gain comparison signal and using the clock signal.

In another aspect of the present disclosure, there is provided an electronic device including a single exposure high dynamic range (HDR) analog front-end (AFE). The single exposure HDR AFE includes input signal circuitry, gain stage circuitry, a continuous-time filter, comparator circuitry, and counter circuitry. The input signal circuitry configured to generate an input signal. The gain stage circuitry configured to receive the input signal, generate a high gain output signal based on the input signal, and generate a low gain output signal based on the input signal. The continuous-time filter configured to generate a filtered high gain output signal by filtering the high gain output signal. The comparator circuitry configured to receive a ramp voltage, generate a high gain comparison signal by comparing the filtered high gain output signal to the ramp voltage, and generate a low gain comparison signal by comparing the low gain output signal to the ramp voltage. The counter circuitry configured to receive a clock signal, generate a high gain digital output signal based on the high gain comparison signal and using the clock signal, and generate a low gain digital output signal based on the low gain comparison signal and using the clock signal.

In yet another aspect of the present disclosure, there is provided a method for operating a single exposure high dynamic range (HDR) analog front-end (AFE). The method includes generating, with input signal circuitry, an input signal. The method includes receiving, with gain stage circuitry, the input signal. The method includes generating, with the gain stage circuitry, a high gain output signal based on the input signal. The method includes generating, with the gain stage circuitry, a low gain output signal based on the input signal. The method includes generating, with a continuous-time filter, a filtered high gain output signal by filtering the high gain output signal. The method includes receiving, with comparator circuitry, a ramp voltage. The method includes generating, with the comparator circuitry, a high gain comparison signal by comparing the filtered high gain output signal to the ramp voltage. The method includes generating, with the comparator circuitry, a low gain comparison signal by comparing the low gain output signal to the ramp voltage. The method includes receiving, with counter circuitry, a clock signal. The method includes generating, with the counter circuitry and the clock signal, a high gain digital output signal based on the high gain comparison signal. The method also includes generating, with the counter circuitry and the clock signal, a low gain digital output signal based on the low gain comparison signal.

In this manner, the above aspects of the present disclosure provide for improvements in at least the technical field of imaging, as well as the related technical fields of signal processing, image processing, and the like.

This disclosure can be embodied in various forms, including hardware or circuits controlled by computer-implemented methods, computer program products, computer systems and networks, user interfaces, and application programming interfaces; as well as hardware-implemented methods, signal processing circuits, image sensor circuits, application specific integrated circuits, field programmable gate arrays, and the like. The foregoing summary is intended solely to give a general idea of various aspects of the present disclosure, and does not limit the scope of the disclosure in any way.

DESCRIPTION OF THE DRAWINGS

These and other more detailed and specific features of various embodiments are more fully disclosed in the following description, reference being had to the accompanying drawings, in which.

DETAILED DESCRIPTION

In the following description, numerous details are set forth, such as flowcharts, data tables, and system configurations. It will be readily apparent to one skilled in the art that these specific details are merely exemplary and not intended to limit the scope of this application.

Moreover, while the present disclosure focuses mainly on examples in which the processing circuits are used in image sensors, it will be understood that this is merely one example of an implementation. It will further be understood that the disclosed systems and methods can be used in any device in which there is a need to reduce noise in a signal processing or other analog circuit; for example, an audio signal processing circuit, industrial measurement and systems, and the like. Furthermore, the image sensor implementations described below may be incorporated into an electronic apparatus, including but not limited to a smartphone, a tablet computer, a laptop computer, and the like.

Figure 1:
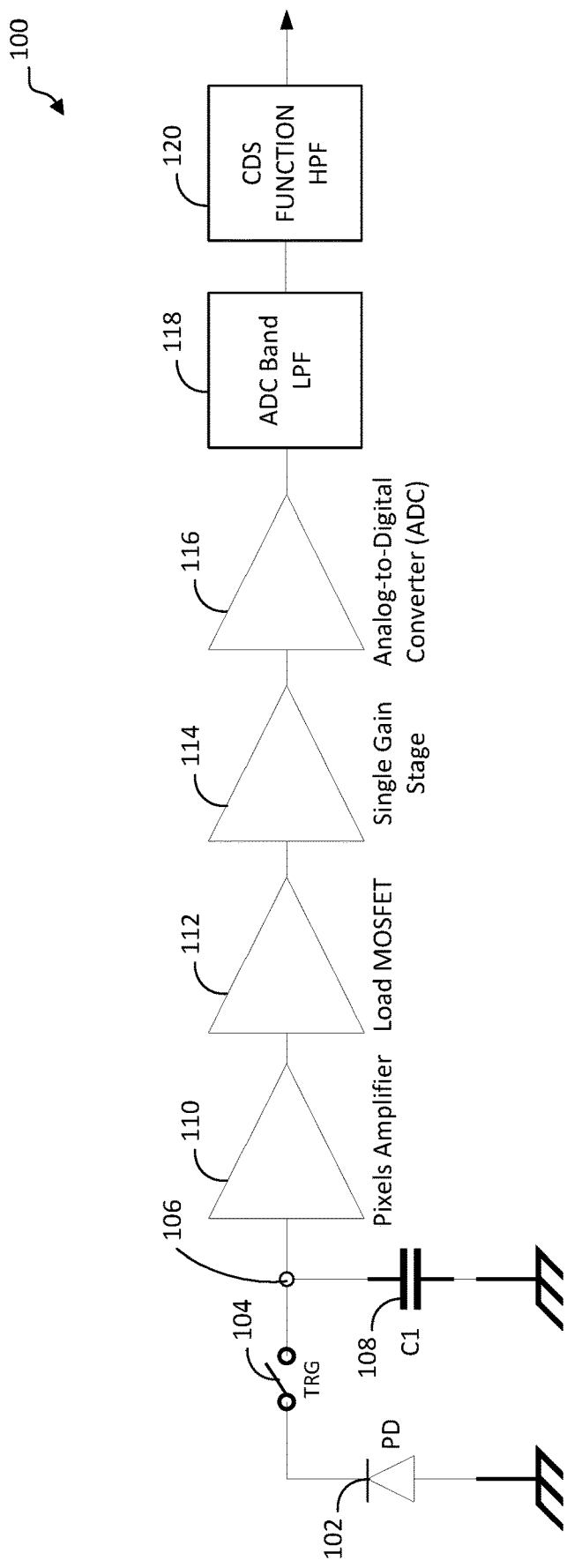
FIG. 1 is a diagram illustrating a comparative example of a single exposure high dynamic range (HDR) analog front-end for CMOS image sensors.

FIG. 1 is a diagram illustrating a comparative example of a single exposure high dynamic range (HDR) analog front-end (AFE) 100 for CMOS image sensors. The AFE architecture 100 includes a photodiode 102, a trigger switch 104, a floating diffusion 106, a capacitor 108, a pixels amplifier 110, a load MOSFET (LM) 112, a single gain stage 114, an analog-to-digital converter (ADC) 116, an ADC band low-pass filter (LPF) 118, and a CDS function high-pass filter (HPF) 120.

In the AFE architecture 100, the LM 112 outputs a VSL signal that is converted to an inverted signal per the gain setting. The VSL signal is amplified to reduce the input-referred noise. For example, the single gain stage 114 includes an amplifier with a first capacitor ($C_{in}$) electrically connected between an inverting terminal of the amplifier and an output node of the LM 112. In this example, the single gain stage 114 includes a second capacitor ($C_{fb}$) electrically connected to the inverting terminal of the amplifier and an output terminal of the amplifier. Additionally, in this example, the single gain stage 114 also includes a single reset transistor electrically connected to the inverting terminal of the amplifier and the output terminal of the amplifier, and in parallel to the second capacitor. The single reset transistor resets the voltage at the output of the amplifier after each amplification.

In this example, and assuming ideal amplifier characteristics, the gain of the single gain stage is determined by the capacitance ratio of the first and second capacitors as set forth in Expression 1.

$$\text{Gain} = -\frac{C_{fb}}{C_{in}} \quad (1)$$

The AFE architecture 100 is different from the traditional AFE architecture because the single gain stage 114 has a single capacitive gain stage between the photodiode 102 and a comparator of the ADC 116. However, the addition of the single gain stage 114 adds noise to the VSL signal. Further, the addition of the single gain stage 114 inverts the VSL signal, which necessitates an inverted slope for the ADC 116. The AFE architecture 100 has a dynamic range of approximately 80-88 decibels (dB), where the dynamic range is defined as the maximum number of electrons divided by the input-referred readout integrated circuit (ROIC) noise floor in electrons.

Figure 2:
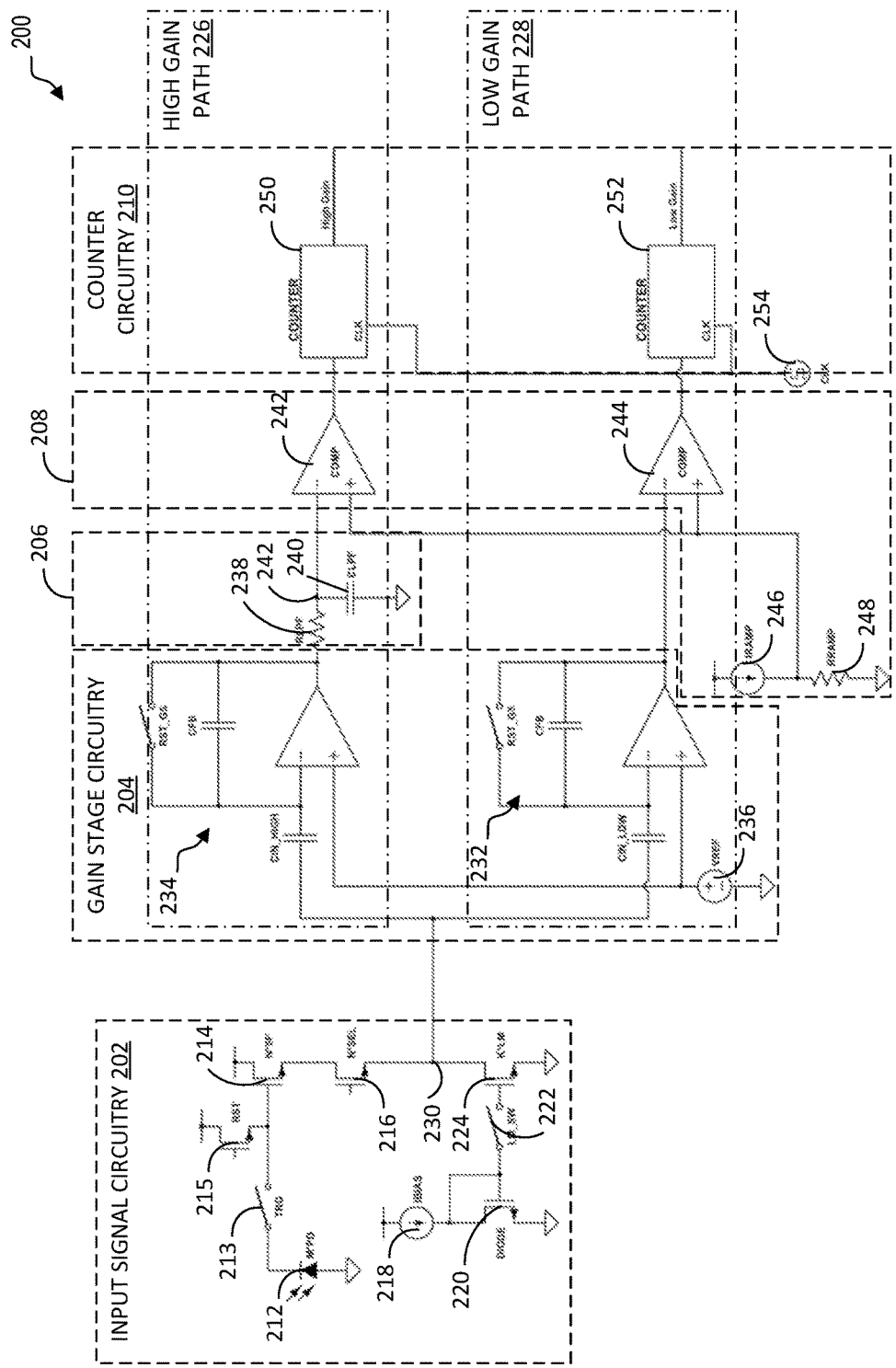
FIG. 2 is a circuit diagram illustrating an example of a single exposure high dynamic range (HDR) analog front-end (AFE) for CMOS image sensors, in accordance with various aspects of the present disclosure.

FIG. 2 is a circuit diagram illustrating an example of a single exposure high dynamic range (HDR) analog front-end (AFE) 200 for CMOS image sensors, in accordance with various aspects of the present disclosure. Unlike the HDR AFE 100, the HDR AFE 200 has two capacitive gain stages that provide the HDR AFE 200 with a dynamic range that is equal to or greater than 96 decibels (dB), and in some examples, greater than 100 dB.

The AFE architecture 200 includes an input circuitry 202, a gain stage circuitry 204, a continuous-time filter 206, a comparator circuitry 208, and a counter circuitry 210. The input circuitry 202 generally corresponds to the photodiode 102, the trigger switch 104, the floating diffusion 106, the capacitor 108, the pixels amplifier 110, and the LM 112 of FIG. 1. The gain stage circuitry 204 generally corresponds to the gain stage 114 of FIG. 1, although the gain stage circuitry 204 includes both a high gain stage and a low gain stage as described in greater detail below. The comparator circuitry 208 and the counter circuitry 210 generally correspond to the ADC 116 of FIG. 1. Consequently, redundant description of these section is not included herein.

The input circuitry 202 includes one or more photodiodes 212, one or more transfer gates 213, one or more reset transistors 215, one or more source follower transistors 214 (e.g., one or more n-channel metal-oxide-semiconductor (NMOS) transistors), one or more selection transistors 216 (e.g., one or more NMOS transistors), a current source 218, a diode transistor 220 (e.g., a NMOS transistor), a load MOSFET (LM) switch 222, and one or more LM transistors 224 (e.g., one or more NMOS transistors). The gain stage circuitry 204, the comparator circuitry 208, and the counter circuitry 210 also have two gain paths: a high gain path 226 and a low gain path 228. The continuous-time filter 206 is only part of the high gain path 226.

The one or more photodiodes 212 are electrically connected to a first end of the one or more transfer gates 213. A second of the one or more transfer gates 213 is electrically connected to a first node. A source of the one or more reset transistors 215 is also electrically connected to the first node, and the first node is electrically connected to a gate of the one or more source follower transistors 214. A gate of the one or more reset transistors 215 is configured to receive a reset signal. A drain of the one or more reset transistors 215 is electrically connected to a supply voltage. Likewise, a drain of the one or more source follower transistors 214 is electrically connected to a supply voltage. A source of the one or more source follower transistors 214 is electrically connected to a drain of the one or more selection transistors 216. A source of the one or more selection transistors 216 is electrically connected to an output node 230.

The current source 218 is electrically connected between the supply voltage and both a drain and a gate of the diode-connected transistor 220. The source of the diode-connected transistor 220 is electrically connected to a ground. The gate of the diode-connected transistor 220 is also electrically connected to a first end of the LM switch 222. A second end of the LM switch 222 is electrically connected to a gate of the one or more LM transistors 224. A source of the one or more LM transistors 224 is electrically connected to a ground and a drain of the one or more LM transistors 224 is electrically connected to the output node 230.

In the example of FIG. 2, the input circuitry 202 in the HDR AFE 200 is one binned 4 T pixel (i.e., the input circuitry 202) connected to two capacitive gain paths, i.e., the high gain path 226 and the low gain path 228. The input circuitry 202 is annotated by having K load MOS current sinks, N source follower transistors, N select transistors, and M floating diffusion connections, where K, N, and M are integers.

The gain stage circuitry 204 includes a low gain stage 232 and a high gain stage 234. The low gain stage 232 and the high gain stage 234 are each similar to the single gain stage 114 as described above in FIG. 1.

The low gain stage 232 handles the full electron range of the input circuitry 202. Typical gain values for the low gain stage 228 may range from 0.5 to 2.0.

The high gain stage 234 creates the necessary noise floor to meet the dynamic range requirements (i.e., to exceed the 84 dB dynamic range in the HDR AFE 100). Typical gain values for the high gain stage 228 may be range from 8 to 64.

As illustrated in FIG. 2, the high gain path 226 includes the continuous-time filter 206. In one example, the continuous-time filter 206 is a low-pass filter (LPF) between the output of the high-gain stage 234 and the input of a comparator 242 of the comparator circuitry 208. In one specific example, the continuous-time filter 206 includes a resistor 238 and a capacitor 240. A first end of the resistor 238 is electrically connected to the output of the high-gain stage 234 and a second end is electrically connected to a first node 242. A first end of the capacitor 240 is electrically connected to the first node 242 and a second end of the capacitor 240 is electrically connected to a ground. The first node 242 is electrically connected to the input of the comparator 242.

The continuous-time filter 206 is needed to filter the noise of the one or more source follower transistors 214, the one or more LM transistors 224, and the high gain stage 234 such that the noise floor is low enough to meet the dynamic range requirements. Unlike the high gain stage 234, shot noise completely dominates the noise floor of the low-gain gain stage 232.

The comparator circuitry 208 includes a first compactor 242, a second comparator 244, a ramp current source 246, and a resistor 248. The ramp current source 246 and the resistor 248 supply a ramp voltage. A first terminal of the first comparator 242 receives the filtered high gain output signal from the continuous-time filter 206. A second terminal of the first comparator 242 receives the ramp voltage from the ramp current source 246 and the resistor 248. The first comparator 242 generates a high gain comparison signal by comparing the filtered high gain output signal to the ramp voltage.

A first terminal of the second comparator 244 receives the low gain output signal from the low gain stage 232. A second terminal of the second comparator 244 receives the ramp voltage from the ramp current source 246 and the resistor 248. The second comparator 244 generates a low gain comparison signal by comparing the low gain output signal to the ramp voltage at an output terminal.

The counter circuitry 210 includes a first counter 250, a second counter 252, and a clock 254 that generates a clock signal. An input terminal of the first counter 250 receives the high gain comparison signal from the comparator 242. The first counter 250 generates a high gain digital output signal based on the high gain comparison signal and using the clock signal. An input terminal of the second counter 252 receives the low gain comparison signal from the comparator 244. The second counter 252 generates a low gain digital output signal based on the low gain comparison signal and using the clock signal.

In the example of FIG. 2, the binned pixel (i.e., the input circuitry 202) drives both the high gain path 226 and the low gain path 228. Consequently, one low-gain stage or one-high gain stage per VSL line cannot be implemented, as is typically done. Instead, the implementation requires a high-gain path and a low-gain path per P VSL lines, where P is an integer. In other words, the high dynamic range (96 dB, for example) is not easily implemented in the full imaging mode because the two gain paths would have to be physically stacked, which is not typically practical from an area perspective. However, the HDR AFE 200 is easily implemented in sensing modes, where the image resolution is less than full resolution (e.g., a QVGA resolution).

Lastly, the gains of the two paths (i.e., the low gain stage 232 and the high gain stage 234) are chosen such that there are no "missing electrons" between the two paths. For example, when the high gain path 226 has a maximum number of electrons of 50,000, then the low gain path 228 will have a minimum number of electrons less than 50,000. This guarantees that there is no input electron number between 0 and the total number of maximum electrons that results in an invalid ADC code. There is never a condition where the ADC code from the high-gain path is the full-scale value and the ADC code from the low-gain path is zero.

Figure 3:
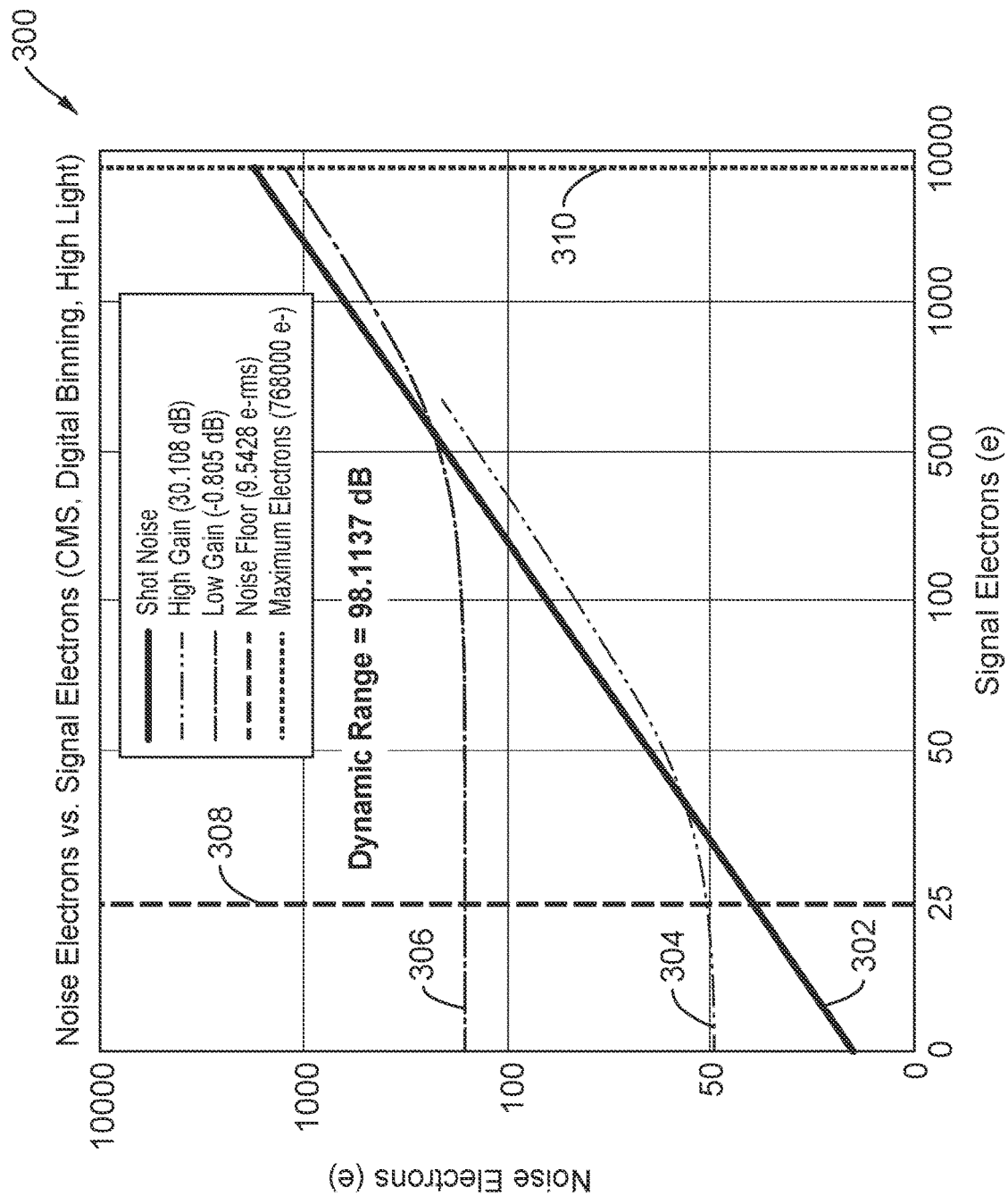
FIG. 3 is a chart illustrating noise electrons versus signal electrons of the single exposure HDR AFE of FIG. 2, in accordance with various aspects of the present disclosure.

FIG. 3 is a chart illustrating a plot 300 of noise electrons versus signal electrons of the single exposure HDR AFE 200 of FIG. 2, in accordance with various aspects of the present disclosure. FIG. 3 is described with respect to FIG. 2.

The plot 300 includes a shot noise plot line 302, a high gain plot line 304, a low gain plot line 306, a noise floor plot line 308, and a maximum electrons plot line 310. In the plot 300, the single exposure HDR AFE 200 of FIG. 2 has a dynamic range of 98.1137 dB.

Additionally, the plot 300 only considers thermal noise. The plot 300 does not consider flicker noise that needs to be considered separately, and typically reduces the dynamic range by 2-3 dB. In other words, the single exposure HDR AFE 200 of FIG. 2 has a dynamic range of approximately 96 dB after considering flicker noise.

In the example of FIG. 3, the plot 300 make several assumptions. First, the plot 300 assumes N is 64, and the one or more pixels 212 are each a 12,000 full-well electron pixel that are gained together to create one 768,000 full-well electron sensing mode pixel. Second, the required noise floor to achieve 96 dB is assumed to be 12 e-rms. Third, the conversion gain of the binned pixel is assumed to be 1 uV/e–. Fourth, it is assumed that eight VSL lines are ganged together such that the flicker and thermal noise of the effective transistor created by this ganging is reduced. Fifth, it is assumed that each individual source follower transistor (each of the source follower transistors 214) consumes four microamperes (uA) of power. Sixth, it is assumed the ADC (e.g., the comparator circuitry 208 and the counter circuitry 210) is twelve bits (4096 counts) to reduce quantization noise. Seventh, it is assumed that the gain of the high-gain path 226 is 32 and the gain of the low-gain path 228 is 0.911. Eighth, the NBW of the LPF (e.g., the continuous-time filter 206) is assumed to be 125 kHz (for example, 1.25 megaohms (Me) with respect to the resistor 238 and 1 picofarad (pF) with respect to the capacitor 240).

In the high-gain path 226, the maximum number of electrons is 21,875, which would correspond to an ADC code of 4095 from the ADC. Further, in the low-gain path 228, one ADC code is represented by 187.5 electrons such that the first 116 ADC codes of the ADC in the low-gain path 228 overlap with that of the high-gain path 226 (i.e., 116.666 codes*187.5 electrons/code=21,875 electrons).

The high gain is shown to be 30.103 dB with the high gain plot line 304. The low gain is shown to be –0.805 dB with the low gain plot line 306. The noise floor is shown to be 9.54 e-rms with the noise floor plot line 308. The maximum number of electrons is shown to be 768,000 e– with the maximum electrons plot line 310.

Further, flicker noise is more important in architectures with high-gain because the gain stage itself gains up the flicker noise prior to the ADC. Consequently, the LPF (i.e., the continuous-time filter 206) is only needed in the high-gain path 226 because the low gain path is dominated by shot noise. In other words, the layout of the LPF (i.e., the continuous-time filter 206) may be split across the high-gain stage 234 and the low-gain stage 232 such that the vertical height is reduced, and in some examples, the LPF may be included in the low-gain path 228.

Additionally, the LPF (i.e., the continuous-time filter 206) introduces a new settling time into the single exposure HDR AFE 200. The LPF would need to be settled before performing an ADC conversion.

Further, as explained above, the gain stage circuitry 204 inverts the signal. Therefore, in some examples, when there is a mode where the gain stage is bypassed then this will have to be considered by the comparator and/or DAC. Additionally, in some examples, correlated multiple sampling (CMS) may be used, to reduce thermal and flicker noise, with the single exposure HDR AFE 200.

With respect to the physical height of the single exposure HDR AFE 200, estimates show that the vertical height will increase 150 micrometers µm to 200 µm compared to the single exposure HDR AFE 100. This increase in height estimate is based on there being one gain stage per comparator. For example, one column comparator would have a high-gain stage and the adjacent column comparator would have a low-gain stage. The LPF (i.e., the continuous-time filter 206) may be laid across the two gain stages. The design and layout of the two gain stages may also be identical to avoid FPN and/or vertical lines in the image.

The increase in vertical height may be decreased if one gain stage is spanned more than one column comparator. However, the one gain stage per column comparator increases the amount of parallelism that may be performed when in certain sensing modes.

Figure 4:
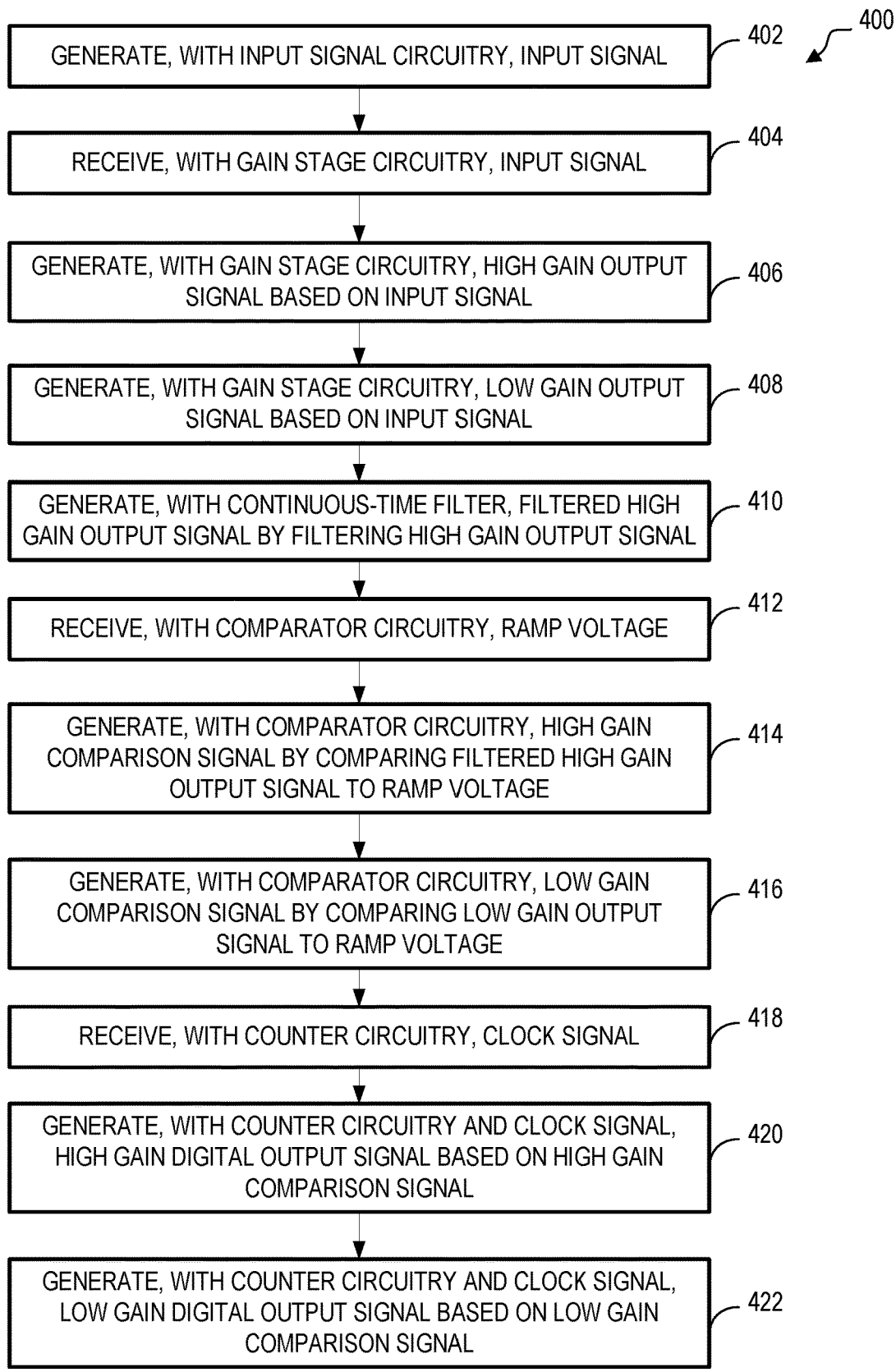
FIG. 4 is a flowchart illustrating an example process for operating the single exposure HDR AFE of FIG. 2, in accordance with various aspects of the present disclosure.

FIG. 4 is a flowchart illustrating an example process 400 for operating the single exposure HDR AFE 200 of FIG. 2, in accordance with various aspects of the present disclosure. FIG. 4 is described with respect to the single exposure HDR AFE 200 of FIG. 2.

The process 400 includes generating, with input signal circuitry, an input signal (at block 402). For example, in the input signal circuitry 202, the one or more transfer gates 213 may be open and the one or more reset transistors 215 are closed to reset the gate of the one or more source follower transistors 214 to a fixed voltage that causes the source voltage of the one or more source follower transistors 214 to be a first voltage at the output node 230. Blocks 404-422 described below may also be performed while the source voltage is the first voltage to generate a first correlated double sampling (CDS) sample.

While the one or more transfer gates 213 are opened, the one or more photodiodes 212 convert photons to electrons and the electrons are stored in the one or more photodiodes 212. When the one or more reset switches 215 open, the one or more transfer gates 213 close, and electrons from the one or more photodiodes 212 are transferred to the gate/floating diffusion of the one or more source follower transistors 214. This causes the gate, and thus the source voltage of the one or more source follower transistors 214 to change, at the output node 230 from the first voltage to a second voltage that is different from the first voltage. Blocks 404-422 described below may also be performed while the source voltage is the second voltage to generate a second CDS sample.

Additionally, in the input signal circuitry 202, when the LM switch 222 receives an enable signal, the LM switch 222 closes and provides an activation signal to the one or more LM transistors 224. The one or more LM transistors 224 amplify the first voltage or the second voltage at the output node 230.

The process 400 includes receiving, with gain stage circuitry, the input signal (at block 404). For example, in the gain stage circuitry 204, the high gain stage 234 receives the second signal from the output node 230 and the low gain stage 232 receives the second signal from the output node 230.

The process 400 includes generating, with the gain stage circuitry, a high gain output signal based on the input signal (at block 406). For example, in the gain stage circuitry 204, the high gain stage 234 generates a high gain output signal based on the second signal. The high gain stage 234 gains the second signal based on a capacitance ratio between a first capacitor and a second capacitor in the high gain stage 234 as described above in FIG. 1.

The process 400 includes generating, with the gain stage circuitry, a low gain output signal based on the input signal (at block 408). For example, in the gain stage circuitry 204, the low gain stage 232 generates a low gain output signal based on the second signal. The low gain stage 232 gains the second signal based on a capacitance ratio between a first capacitor and a second capacitor in the low gain stage 232 as described above in FIG. 1.

The process 400 includes generating, with a continuous-time filter, a filtered high gain output signal by filtering the high gain output signal (at block 410). For example, in the continuous-time filter 206, a low-pass filter formed from the resistor 238 and the capacitor 240 generates a filtered high gain output signal by filtering the high gain output signal from the high gain stage 234.

The process 400 includes receiving, with comparator circuitry, a ramp voltage (at block 412). For example, in the comparator circuitry 208, the first comparator 242 receives the ramp voltage from the ramp current source 246 and the resistor 248 and the second comparator 244 receives the ramp voltage from the ramp current source 246 and the resistor 248.

The process 400 includes generating, with the comparator circuitry, a high gain comparison signal by comparing the filtered high gain output signal to the ramp voltage (at block 414). For example, in the comparator circuitry 208, the first comparator 242 generates a high gain comparison signal by comparing the filtered high gain output signal from the continuous-time filter 206 to the ramp voltage.

The process 400 includes generating, with the comparator circuitry, a low gain comparison signal by comparing the low gain output signal to the ramp voltage (at block 416). For example, in the comparator circuitry 208, the second comparator 244 generates a low gain comparison signal by comparing the low gain output signal from the low gain stage 232 to the ramp voltage.

The process 400 receiving, with counter circuitry, a clock signal (at block 418). For example, in the counter circuitry 210, the first counter 250 receives a clock signal from the clock 254 and the second comparator receives the ramp voltage from the ramp current source 246 and the resistor 248.

The process 400 includes generating, with the counter circuitry and the clock signal, a high gain digital output signal based on the high gain comparison signal (at block 420). For example, in the counter circuitry 210, the first counter 250 generates a high gain digital output signal by counting a parameter of the high gain comparison signal using the clock signal.

The process 400 also includes generating, with the counter circuitry and the clock signal, a low gain digital output signal based on the low gain comparison signal (at block 422). For example, in the counter circuitry 210, the first counter 252 generates a low gain digital output signal by counting a parameter of the low gain comparison signal using the clock signal.

In some examples, the process 400 may include generating, with processing circuitry, a machine vision image based on the high gain digital output signal and the low gain digital output signal. The machine vision image has a dynamic range (i.e., the ratio between the largest and smallest values in the machine vision image) greater than 84 dB. In some examples, the machine vision image has a dynamic range of approximately 96 dB.

The basic way to understand the dynamic range in the digital domain is to convert the ADC values (i.e., the high gain digital output signal and the low gain digital output signal) of the high gain path and the low gain path to the equivalent input electron values. The equivalent input electron values are the electrons on the input. In the digital domain, the rms value of the noise floor in electrons is also known. Thus, with the equivalent input electron values and the rms value of the noise floor, divide them, and calculate the signal-to-noise-ratio (SNR). The full dynamic range may be measured when a signal that maxes out the low gain path is measured and is divided by the noise floor of the high gain path.

Expressions 1 and 2 below are provided to clarify how the ADC values may be converted from the two gain paths into electrons, VREFH and VREFL are equal to the ramp voltage going to the comparator, and 2N−1=maximum number of counts in a single slope ADC conversion.

$$e_H^- = \frac{ADC_H \cdot VREF_H}{Gain_H \cdot C_G \cdot (2^N - 1)} \quad (1)$$

$$e_L^- = \frac{ADC_L \cdot VREF_L}{Gain_L \cdot C_G \cdot (2^N - 1)} \quad (2)$$

The SNR may be calculated from eH/eNoise or eL/eNoise where eNoise is provided below in Expression 3.

$$e_{Noise}^- = \frac{\sigma_{NOISE} \cdot VREF_L}{Gain_L \cdot C_G \cdot (2^N - 1)} \quad (3)$$

CG is equal to conversion gain of the (binned) pixel. σ_NOISE is calculated by finding the standard deviation or rms value of the ADC noise floor.

Figure 5:
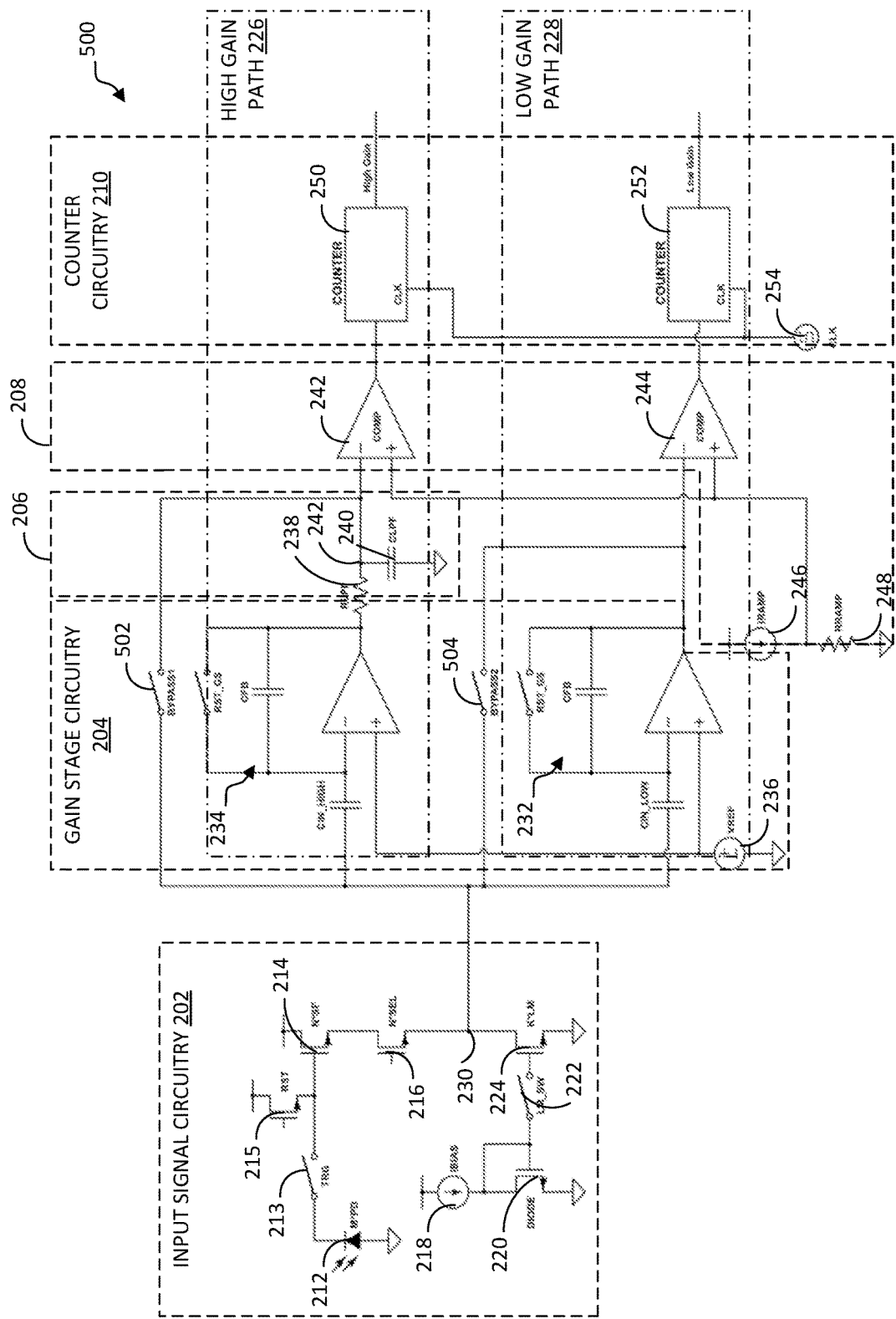
FIG. 5 is a circuit diagram illustrating a second example of a single exposure high dynamic range (HDR) analog front-end (AFE) for CMOS image sensors, in accordance with various aspects of the present disclosure.

FIG. 5 is a circuit diagram illustrating a second example of a single exposure high dynamic range (HDR) analog front-end (AFE) 500 for CMOS image sensors, in accordance with various aspects of the present disclosure. The single exposure HDR AFE 500 is similar to the single exposure HDR AFE 200 of FIG. 2. Consequently, redundant description between the similar components of the single exposure HDR AFE 200 and the single exposure HDR AFE 500 is not repeated herein.

The difference between the single exposure HDR AFE 500 and the single exposure HDR AFE 200 is the first bypass switch 502 and the second bypass switch 504 included in the single exposure HDR AFE 500. The first bypass switch 502 is electrically connected between the output node of the input signal circuitry 202 and the inverting terminal of the comparator 242. The first bypass switch 502 is also in parallel to the gain stage circuitry 204 the continuous-time filter 206 that are in the high gain path 226.

The second bypass switch 504 is electrically connected between the output node of the input signal circuitry 202 and the inverting terminal of the comparator 244. The second bypass switch 504 is also in parallel to the gain stage circuitry 204 that is in the low gain path 228.

The first bypass switch 502 and the second bypass switch 504 may be used in combination with each other to change the mode of the single exposure HDR AFE 500. When the first bypass switch 502 and the second bypass switch 504 are in an "OPEN" state, the single exposure HDR AFE 500 operates in the same way as described above with respect to the single exposure HDR AFE 200 of FIG. 2, which may be referred to as a "High Dynamic Range (HDR) mode." The HDR mode provides the 96 dB of dynamic range.

When the first bypass switch 502 and the second bypass switch 504 are in a "CLOSED" state, the first bypass switch 502 bypasses the high gain stage circuitry 234 and the continuous-time filter 206 and the second bypass switch 504 bypasses the low gain stage circuitry 232, which may be referred to as a "Non-HDR mode" or "Bypass mode." The Non-HDR mode allows to the single exposure HDR AFE 500 to operate faster and does not provide the 96 dB of dynamic range that is available in the HDR mode. Additionally, during the Bypass mode, the input signal from the input signal circuitry 202 is no longer inverted from the gain stage circuitry 204. In other words, the comparator circuitry 208 compare an inverted version of the input signal during the "HDR mode" and compare a non-inverted version of the input signal during the "Non-HDR mode."

The following are enumerated examples of single exposure high dynamic range (HDR) analog front-ends (AFEs), electronic devices, and methods of the present disclosure. Example 1: a single exposure high dynamic range (HDR) analog front-end (AFE) comprising: input signal circuitry configured to generate an input signal; gain stage circuitry configured to receive the input signal, generate a high gain output signal based on the input signal, and generate a low gain output signal based on the input signal; a continuous-time filter configured to generate a filtered high gain output signal by filtering the high gain output signal; comparator circuitry configured to receive a ramp voltage, generate a high gain comparison signal by comparing the filtered high gain output signal to the ramp voltage, and generate a low gain comparison signal by comparing the low gain output signal to the ramp voltage; and counter circuitry configured to receive a clock signal, generate a high gain digital output signal based on the high gain comparison signal and using the clock signal, and generate a low gain digital output signal based on the low gain comparison signal and using the clock signal.

Example 2: the single exposure HDR AFE according to Example 1, wherein the input signal circuitry includes one or more photodiodes, one or more transfer gates, one or more reset transistors, one or more source follower transistors, one or more selection transistors, a Load MOSFET (LM) switch, one or more Load MOSFET (LM) transistors, a current source, and a diode transistor.

Example 3: the single exposure HDR AFE according to Example 2, wherein the one or more photodiodes is equal to M, wherein the one or more source follower transistors and the one or more selection transistors are each equal to N, wherein the one or more LM transistors is equal to K, wherein M, N, and K are each a positive integer.

Example 4: the single exposure HDR AFE according to Example 3, wherein M is 64, wherein each of the one or more photodiodes is a 12,000 full-well electron pixel, and wherein the one or more photodiodes are ganged together to create one 768,000 full-well electron sensing mode pixel.

Example 5: the single exposure HDR AFE according to any of Examples 2 through 4, wherein the one or more photodiodes are electrically connected to a first end of the one or more transfer gates, wherein a second of the one or more transfer gates is electrically connected to a first node, wherein a source of the one or more reset transistors is also electrically connected to the first node that is electrically connected to a gate of the one or more source follower transistors, wherein a drain of the one or more reset transistors is electrically connected to a supply voltage, wherein a drain of the one or more source follower transistors is electrically connected to a supply voltage, wherein a source of the one or more source follower transistors is electrically connected to a drain of the one or more selection transistors, wherein a source of the one or more selection transistors is electrically connected to an output node, wherein the current source is electrically connected between the supply voltage and both a drain and a gate of the diode transistor, wherein the source of the diode transistor is electrically connected to a ground, wherein the gate of the diode transistor is electrically connected to a first end of the LM switch, wherein a second end of the LM switch is electrically connected to a gate of the one or more LM transistors, wherein a source of the one or more LM transistors is electrically connected to the ground, and wherein a drain of the one or more LM transistors is electrically connected to the output node.

Example 6: the single exposure HDR AFE according to any of Examples 1 through 5, wherein the continuous-time filter is a low-pass filter including a resistor and a capacitor.

Example 7: the single exposure HDR AFE of Example 6, wherein the resistor is 1.25 megaohms (MΩ), and wherein the capacitor is 1 picofarad (pF).

Example 8: the single exposure HDR AFE according to any of Examples 1 through 7, wherein the gain stage circuitry includes a first amplifier with a first set of capacitors forming a high gain stage configured to generate the high gain output signal, and a second amplifier with a second set of capacitors forming a low gain stage configured to generate the low gain output signal, wherein the comparator circuitry includes a ramp voltage supply configured to generate the ramp voltage, a first comparator configured to generate the high gain comparison signal by comparing the filtered high gain output signal to the ramp voltage, a second comparator configured to generate the low gain comparison signal by comparing the low gain output signal to the ramp voltage, and wherein the counter circuitry includes a clock configured to generate the clock signal, a first counter configured to generate the high gain digital output signal based on the high gain comparison signal and using the clock signal, and a second counter configured to generate the low gain digital output signal based on the low gain comparison signal and using the clock signal.

Example 9: the single exposure HDR AFE of any of Examples 1 through 8, wherein the HDR is approximately 96 decibels (dB).

Example 10: an electronic device comprising: a single exposure, high dynamic range (HDR), analog front-end (AFE) including input signal circuitry configured to generate an input signal; gain stage circuitry configured to receive the input signal, generate, with high gain circuitry, a high gain output signal based on the input signal, and generate, with low gain circuitry, a low gain output signal based on the input signal; a continuous-time filter configured to generate a filtered high gain output signal by filtering the high gain output signal; comparator circuitry configured to receive a ramp voltage, generate a high gain comparison signal by comparing the filtered high gain output signal to the ramp voltage, and generate a low gain comparison signal by comparing the low gain output signal to the ramp voltage; and counter circuitry configured to receive a clock signal, generate a high gain digital output signal based on the high gain comparison signal and using the clock signal, and generate a low gain digital output signal based on the low gain comparison signal and using the clock signal.

Example 11: the electronic device according to Example 10, wherein the input signal circuitry includes one or more photodiodes, one or more transfer gates, one or more reset transistors, one or more source follower transistors, one or more selection transistors, a Load MOSFET (LM) switch, one or more Load MOSFET (LM) transistors, a current source, and a diode transistor.

Example 12: the electronic device according to Example 11, wherein the one or more photodiodes is equal to M, wherein the one or more source follower transistors and the one or more selection transistors are each equal to N, wherein the one or more LM transistors is equal to K, wherein M, N, and K are each a positive integer.

Example 13: the electronic device according to Example 12, wherein M is 64, wherein each of the one or more photodiodes is a 12,000 full-well electron pixel, and wherein the one or more photodiodes are ganged together to create one 768,000 full-well electron sensing mode pixel.

Example 14: the electronic device according to the any of Examples 11 through 13, wherein the one or more photodiodes are electrically connected to a first end of the one or more transfer gates, wherein a second of the one or more transfer gates is electrically connected to a first node, wherein a source of the one or more reset transistors is also electrically connected to the first node that is electrically connected to a gate of the one or more source follower transistors, wherein a drain of the one or more reset transistors is electrically connected to a supply voltage, wherein a drain of the one or more source follower transistors is electrically connected to a supply voltage, wherein a source of the one or more source follower transistors is electrically connected to a drain of the one or more selection transistors, wherein a source of the one or more selection transistors is electrically connected to an output node, wherein the current source is electrically connected between the supply voltage and both a drain and a gate of the diode transistor, wherein the source of the diode transistor is electrically connected to a ground, wherein the gate of the diode transistor is electrically connected to a first end of the LM switch, wherein a second end of the LM switch is electrically connected to a gate of the one or more LM transistors, wherein a source of the one or more LM transistors is electrically connected to the ground, and wherein a drain of the one or more LM transistors is electrically connected to the output node.

Example 15: the electronic device according to any of Examples 10 through 14, wherein the continuous-time filter is a low-pass filter including a resistor and a capacitor.

Example 16: the electronic device of Example 15, wherein the resistor is 1.25 megaohms (MΩ), and wherein the capacitor is 1 picofarad (pF).

Example 17: the electronic device according to any of Examples 10 through 16, wherein the gain stage circuitry includes a first amplifier with a first set of capacitors forming a high gain stage configured to generate the high gain output signal, and a second amplifier with a second set of capacitors forming a low gain stage configured to generate the low gain output signal, wherein the comparator circuitry includes a ramp voltage supply configured to generate the ramp voltage, a first comparator configured to generate the high gain comparison signal by comparing the filtered high gain output signal to the ramp voltage, a second comparator configured to generate the low gain comparison signal by comparing the low gain output signal to the ramp voltage, and wherein the counter circuitry includes a clock configured to generate the clock signal, a first counter configured to generate the high gain digital output signal based on the high gain comparison signal and using the clock signal, and a second counter configured to generate the low gain digital output signal based on the low gain comparison signal and using the clock signal.

Example 18: the electronic device of any of Examples 10 through 17, wherein the HDR is approximately 96 decibels (dB).

Example 19: a method for operating a single exposure, high dynamic range (HDR), analog front-end (AFE), the method comprising: generating, with input signal circuitry, an input signal; receiving, with gain stage circuitry, the input signal; generating, with the gain stage circuitry, a high gain output signal based on the input signal; generating, with the gain stage circuitry, a low gain output signal based on the input signal; generating, with a continuous-time filter, a filtered high gain output signal by filtering the high gain output signal; receiving, with comparator circuitry, a ramp voltage; generating, with the comparator circuitry, a high gain comparison signal by comparing the filtered high gain output signal to the ramp voltage; generating, with the comparator circuitry, a low gain comparison signal by comparing the low gain output signal to the ramp voltage; receiving, with counter circuitry, a clock signal; generating, with the counter circuitry and the clock signal, a high gain digital output signal based on the high gain comparison signal; and generating, with the counter circuitry and the clock signal, a low gain digital output signal based on the low gain comparison signal.

Example 20: the method of Example 19, wherein the continuous-time filter is a low-pass filter including a resistor and a capacitor.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A single exposure high dynamic range (HDR) analog front-end (AFE) comprising:
input signal circuitry configured to generate an input signal;
gain stage circuitry configured to
receive the input signal,
generate a high gain output signal based on the input signal, and
generate a low gain output signal based on the input signal;
a continuous-time filter configured to generate a filtered high gain output signal by filtering the high gain output signal;
comparator circuitry configured to
receive a ramp voltage,
generate a high gain comparison signal by comparing the filtered high gain output signal to the ramp voltage, and
generate a low gain comparison signal by comparing the low gain output signal to the ramp voltage; and
counter circuitry configured to
generate a high gain digital output signal based on the high gain comparison signal and using a clock signal, and
generate a low gain digital output signal based on the low gain comparison signal and using the clock signal.

2. The single exposure HDR AFE according to claim 1, wherein
the input signal circuitry includes one or more photodiodes, one or more transfer gates, one or more reset transistors, one or more source follower transistors, one or more selection transistors, a Load MOSFET (LM) switch, one or more Load MOSFET (LM) transistors, a current source, and a diode transistor.

3. The single exposure HDR AFE according to claim 2, wherein
the one or more photodiodes is equal to a first number M, wherein the one or more source follower transistors and the one or more selection transistors are each equal to a second number N, wherein the one or more LM transistors is equal to a third number K, wherein M, N, and K are each a positive integer.

4. The single exposure HDR AFE according to claim 3, wherein
M is 64, wherein each of the one or more photodiodes is a 12,000 full-well electron pixel, and wherein the one or more photodiodes are ganged together to create one 768,000 full-well electron sensing mode pixel.

5. The single exposure HDR AFE according to claim 2, wherein
the one or more photodiodes are electrically connected to a first end of the one or more transfer gates, wherein a second of the one or more transfer gates is electrically connected to a first node, wherein a source of the one or more reset transistors is also electrically connected to the first node that is electrically connected to a gate of the one or more source follower transistors, wherein a drain of the one or more reset transistors is electrically connected to a supply voltage, wherein a drain of the one or more source follower transistors is electrically connected to a supply voltage, wherein a source of the one or more source follower transistors is electrically connected to a drain of the one or more selection transistors, wherein a source of the one or more selection transistors is electrically connected to an output node, wherein the current source is electrically connected between the supply voltage and both a drain and a gate of the diode transistor, wherein the source of the diode transistor is electrically connected to a ground, wherein the gate of the diode transistor is electrically connected to a first end of the LM switch, wherein a second end of the LM switch is electrically connected to a gate of the one or more LM transistors, wherein a source of the one or more LM transistors is electrically connected to the ground, and wherein a drain of the one or more LM transistors is electrically connected to the output node.

6. The single exposure HDR AFE according to claim 1, wherein
the continuous-time filter is a low-pass filter including a resistor and a capacitor, and
the continuous-time filter filters only the high gain output signal.

7. The single exposure HDR AFE of claim 6, wherein
the resistor is 1.25 megaohms (MΩ), and wherein the capacitor is 1 picofarad (pF).

8. The single exposure HDR AFE according to claim 1, wherein
the gain stage circuitry includes a first amplifier with a first set of capacitors forming a high gain stage configured to generate the high gain output signal, and a second amplifier with a second set of capacitors forming a low gain stage configured to generate the low gain output signal, wherein the comparator circuitry includes a ramp voltage supply configured to generate the ramp voltage, a first comparator configured to generate the high gain comparison signal by comparing the filtered high gain output signal to the ramp voltage, a second comparator configured to generate the low gain comparison signal by comparing the low gain output signal to the ramp voltage, and wherein the counter circuitry includes a clock configured to generate the clock signal, a first counter configured to generate the high gain digital output signal based on the high gain comparison signal and using the clock signal, and a second counter configured to generate the low gain digital output signal based on the low gain comparison signal and using the clock signal.

9. The single exposure HDR AFE of claim 1, wherein the HDR is approximately 96 decibels (dB).

10. An electronic device comprising:
a single exposure, high dynamic range (HDR), analog front-end (AFE) including input signal circuitry configured to generate an input signal;
gain stage circuitry configured to
receive the input signal,
generate, with high gain circuitry, a high gain output signal based on the input signal, and
generate, with low gain circuitry, a low gain output signal based on the input signal;
a continuous-time filter configured to generate a filtered high gain output signal by filtering the high gain output signal;
comparator circuitry configured to
receive a ramp voltage,
generate a high gain comparison signal by comparing the filtered high gain output signal to the ramp voltage, and generate a low gain comparison signal by comparing the low gain output signal to the ramp voltage; and counter circuitry configured to generate a high gain digital output signal based on the high gain comparison signal and using a clock signal, and generate a low gain digital output signal based on the low gain comparison signal and using the clock signal.

11. The electronic device according to claim 10, wherein the input signal circuitry includes one or more photodiodes, one or more transfer gates, one or more reset transistors, one or more source follower transistors, one or more selection transistors, a Load MOSFET (LM) switch, one or more Load MOSFET (LM) transistors, a current source, and a diode transistor.

12. The electronic device according to claim 11, wherein the one or more photodiodes is equal to a first number M, wherein the one or more source follower transistors and the one or more selection transistors are each equal to a second number N, wherein the one or more LM transistors is equal to a third number K, wherein M, N, and K are each a positive integer.

13. The electronic device according to claim 12, wherein M is 64, wherein each of the one or more photodiodes is a 12,000 full-well electron pixel, and wherein the one or more photodiodes are ganged together to create one 768,000 full-well electron sensing mode pixel.

14. The electronic device according to claim 11, wherein the one or more photodiodes are electrically connected to a first end of the one or more transfer gates, wherein a second of the one or more transfer gates is electrically connected to a first node, wherein a source of the one or more reset transistors is also electrically connected to the first node that is electrically connected to a gate of the one or more source follower transistors, wherein a drain of the one or more reset transistors is electrically connected to a supply voltage, wherein a drain of the one or more source follower transistors is electrically connected to a supply voltage, wherein a source of the one or more source follower transistors is electrically connected to a drain of the one or more selection transistors, wherein a source of the one or more selection transistors is electrically connected to an output node, wherein the current source is electrically connected between the supply voltage and both a drain and a gate of the diode transistor, wherein the source of the diode transistor is electrically connected to a ground, wherein the gate of the diode transistor is electrically connected to a first end of the LM switch, wherein a second end of the LM switch is electrically connected to a gate of the one or more LM transistors, wherein a source of the one or more LM transistors is electrically connected to the ground, and wherein a drain of the one or more LM transistors is electrically connected to the output node.

15. The electronic device according to claim 10, wherein the continuous-time filter is a low-pass filter including a resistor and a capacitor, and the continuous-time filter filters only the high gain output signal.

16. The electronic device of claim 15, wherein the resistor is 1.25 megaohms (MΩ), and wherein the capacitor is 1 picofarad (pF).

17. The electronic device according to claim 10, wherein the gain stage circuitry includes a first amplifier with a first set of capacitors forming a high gain stage configured to generate the high gain output signal, and a second amplifier with a second set of capacitors forming a low gain stage configured to generate the low gain output signal, wherein the comparator circuitry includes a ramp voltage supply configured to generate the ramp voltage, a first comparator configured to generate the high gain comparison signal by comparing the filtered high gain output signal to the ramp voltage, a second comparator configured to generate the low gain comparison signal by comparing the low gain output signal to the ramp voltage, and wherein the counter circuitry includes a clock configured to generate the clock signal, a first counter configured to generate the high gain digital output signal based on the high gain comparison signal and using the clock signal, and a second counter configured to generate the low gain digital output signal based on the low gain comparison signal and using the clock signal.

18. The electronic device of claim 10, wherein the HDR is approximately 96 decibels (dB).

19. A method for operating a single exposure, high dynamic range (HDR), analog front-end (AFE), the method comprising:

generating, with input signal circuitry, an input signal;

receiving, with gain stage circuitry, the input signal;

generating, with the gain stage circuitry, a high gain output signal based on the input signal;

generating, with the gain stage circuitry, a low gain output signal based on the input signal;

generating, with a continuous-time filter, a filtered high gain output signal by filtering the high gain output signal;

receiving, with comparator circuitry, a ramp voltage;

generating, with the comparator circuitry, a high gain comparison signal by comparing the filtered high gain output signal to the ramp voltage;

generating, with the comparator circuitry, a low gain comparison signal by comparing the low gain output signal to the ramp voltage;

receiving, with counter circuitry, a clock signal;

generating, with the counter circuitry and the clock signal, a high gain digital output signal based on the high gain comparison signal; and generating, with the counter circuitry and the clock signal, a low gain digital output signal based on the low gain comparison signal.

20. The method of claim 19, wherein the continuous-time filter is a low-pass filter including a resistor and a capacitor, and the continuous-time filter filters only the high gain output signal.

* * * * *